Feb. 16, 1965   A. J. HERSTER   3,169,331
INDICIA INDICATING DEVICE
Filed March 30, 1962   2 Sheets-Sheet 1

INVENTOR.
ANTUN J. HERSTER
BY
*W.B.Hampman*
ATTORNEY

Feb. 16, 1965  A. J. HERSTER  3,169,331
INDICIA INDICATING DEVICE
Filed March 30, 1962  2 Sheets-Sheet 2

INVENTOR.
ANTUN J. HERSTER
BY
ATTORNEY

United States Patent Office 3,169,331
Patented Feb. 16, 1965

3,169,331
INDICIA INDICATING DEVICE
Antun J. Herster, 554 S. Buhlfarm Drive, Sharon, Pa.
Filed Mar. 30, 1962, Ser. No. 183,885
6 Claims. (Cl. 40—68)

This invention relates to an indicia indicating device and more particularly to a device incorporating a plurality of indicia carrying wheels which may be individually set to display desired indicia and locked in such setting.

The principal object of the invention is the provision of an indicia indicating device of a simple and inexpensive form.

A further object of the invention is the provision of an indicia indicating device which may be quickly and easily set to display desired indicia and which will retain such setting until manually operated to release the indicia indicating members thereof.

A further object of the invention is the provision of an indicia indicating device that comprises an assembly of a few parts that may be molded of suitable plastic material.

The indicia indicating device disclosed herein is illustrated in a preferred form as usable in connection with servicing an automobile. Specifically, the device provides a plurality of indicia carrying wheels arranged so that indicia on the perimeters of the wheels may be selected and positioned in registry with a plurality of windows so that mileage figures may be shown indicating the time at which the oil was changed, the automobile lubricated, etc. Those skilled in the art will recognize that the indicia carrying wheels may include any desired indicia. The assembled device is small, light weight and inexpensive and can be mounted on an automobile by vacuum cups as shown or otherwise, as will occur to those skilled in the art.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
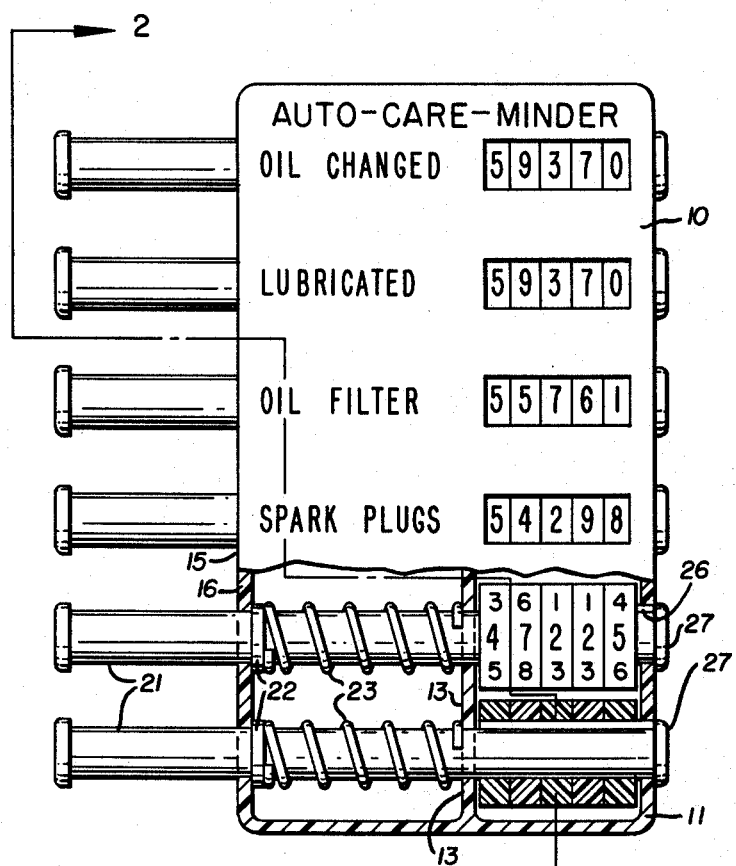
FIGURE 1 is a front view with parts broken away and parts in cross section.
Figure 2:
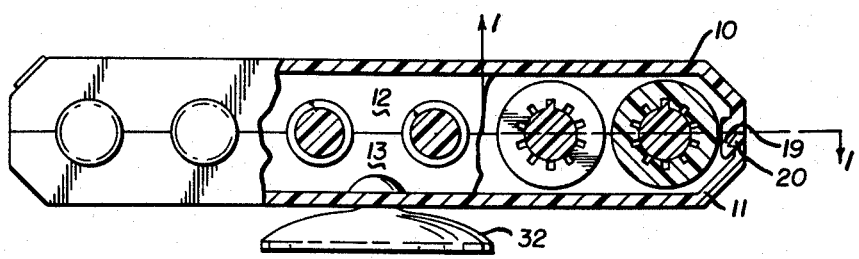
FIGURE 2 is a side elevation on line 2—2 of FIGURE 1 with parts broken away and parts in cross section.
Figure 3:
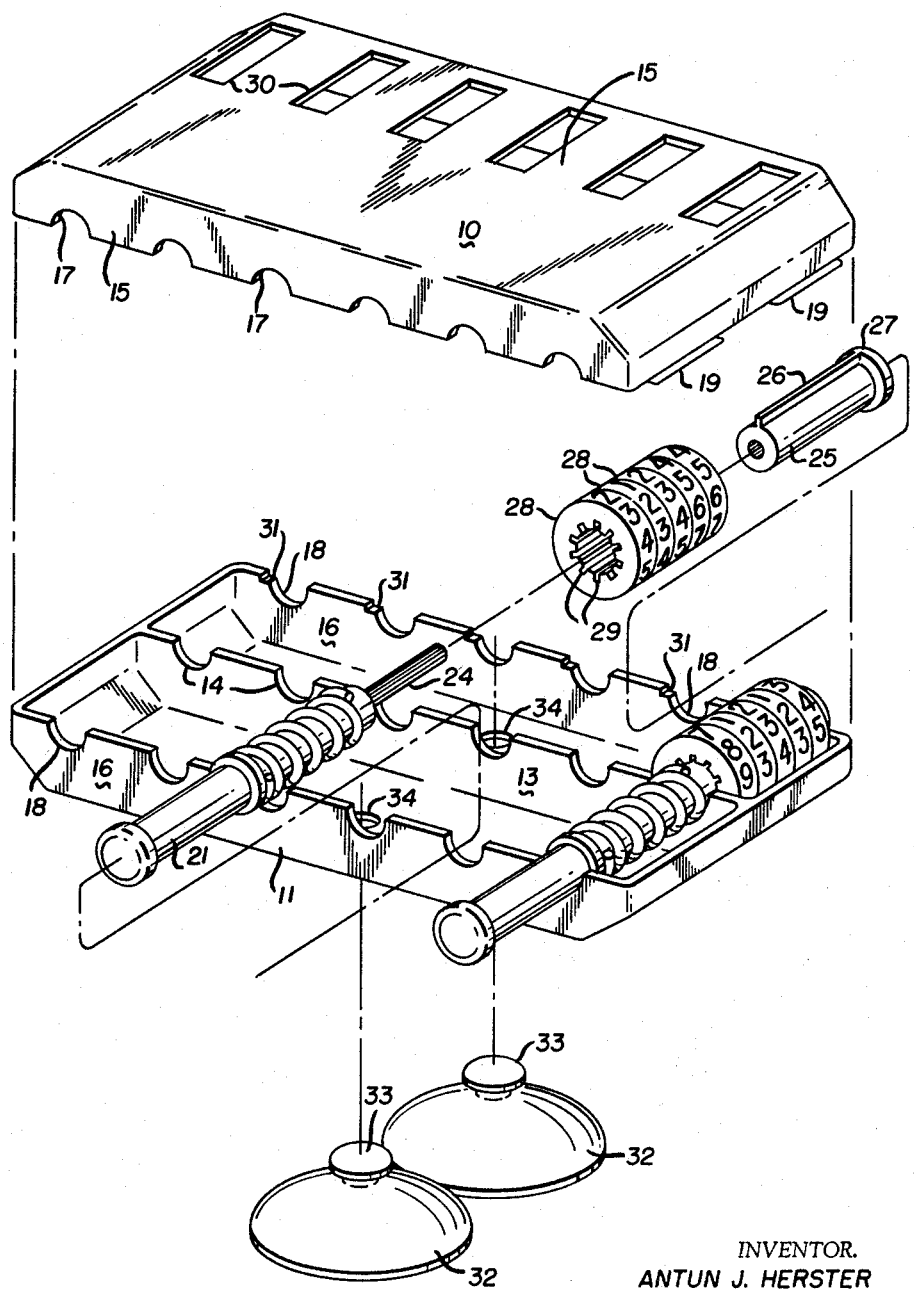
FIGURE 3 is an exploded perspective view showing the relation of the various parts of the device.

By referring to the drawings and FIGURES 1 and 2 in particular, it will be seen that the indicia indicating device comprises a housing formed of front and back portions 10 and 11 respectively, each of which has a longitudinally extending partition 12 and 13 respectively therein, the oppositely disposed major portions of the longitudinal partitions 12 and 13 are notched as indicated at 14 and as best seen in FIGURE 3 of the drawings. The front and back portions 10 and 11 have oppositely disposed side portions 15, 15 and 16, 16 and these are notched as at 18 in transverse alignment with the notches 14 as seen in FIGURES 1 and 3 of the drawings. The opposite ends of the front portion 10 have depending notched extensions 19 thereon and the opposite ends of the back portion 11 have undercut shoulders 20 thereon so that the top portion 10 may be retained in assembled position on the back portion 11 by mutual engagement of the extensions 19 with the undercut shoulders 20. When the device is assembled, it may be retained in assembled relation by these registering parts and/or it may be cemented together as will be recognized by those skilled in the art.

Referring again to FIGURE 1 of the drawings, it will be seen that a plurality of transverse plungers 21, 21 are positioned transversely of the device and that these plungers extend exteriorly of the sides 15 and 16 of the front back portions 10 and 11. The portions of the plungers 21, 21 within the device include shoulders 22, 22 which are normally engaged against the inner walls of the sides 15 and 16. Coil springs 23, 23 are positioned around the plungers 21, 21 between the shoulders 22, 22 and the longitudinal partitions 12 and 13, thus biasing the plungers outwardly or to the left as seen in FIGURES 1 and 3 of the drawings. The innermost portions of the plungers 21, 21 are of reduced diameter and ribbed longitudinally as at 24 and these innermost longitudinally ribbed portions are normally secured in sleeves 25, 25 each of which is ribbed longitudinally on its internal surface for registry between the ribs 24 and each of which has a longitudinally extending spline 26 on its exterior together with a collar 27 on its outermost end.

A plurality of centrally apertured indicia carrying wheels 28, 28 are each provided with a plurality of circumferentially spaced radially extending spline receiving grooves 29-29 therethrough and each wheel 28 is arranged to be positioned over sleeve 25 with the spline 26 in engagement with one of the spline receiving grooves 29 when the device is in set position. Each of the indicia carrying wheels 28 is provided on its periphery with a plurality of numerals. The numerals on the periphery of the indicia carrying wheels 28 which are positioned on the several plungers 21 are arranged as to be positioned in registry with a plurality of window openings 30, 30 in the front portion 10 as best seen in FIGURE 1 of the drawings. It will be observed that notches 18 in the sides 15 and 16 of the device are cutaway as at 31 so that a spline 26 may extend therethrough as seen in FIGURE 1 of the drawings whereby the collar 27 is located on the exterior of the device on the side thereof opposite to the extending plunger.

It will thus be seen that when the device is assembled and secured in assembly as seen in FIGURES 1 and 2 of the drawings, the plungers 21, 21 will be in the positions shown in FIGURE 1 as urged by the springs 23, 23 and that the splines 26, 26 on the sleeves 25, 25 which are in effect portions of the plungers 21, 21 are engaged in the indicia carrying wheels 28, 28 so as to hold the same in non-rotative relation both with respect to the wheels 28, 28 and the remainder of the device. In order to set the desired indicia a plunger 21 is moved inwardly (to the right) as shown in FIGURES 1 and 2 which moves the spline 26 outwardly of its engagement with the spline receiving grooves 29 in the indicia wheels 28, 28 and moves the non-splined portion of the plunger 21 which is normally surrounded by the spring 23 into the indicia carrying wheels 28, 28. The wheels 28, 28 may then be revolved to set up the desired mileage numerals and upon releasing the plunger 21, the spring 23 returns the spline 26 to registry with one of the groove 29 in the indicia carrying wheels 28, 28 and holds the same in the desired setting.

It will thus be seen that a simple and efficient means of mounting, locking, releasing and resetting the indicia carrying wheels 28, 28 has been disclosed and that a combination of a plurality of such plungers and indicia carrying wheels can be incorporated in a housing as shown to provide as many indicating areas as desired. By referring again to FIGURES 2 and 3 of the drawings, it will be observed that the means of attaching the device to an automobile has been illustrated as comprising a pair of vacuum cups 32, 32 which have enlarged head portions 33, 33 engageable through openings 34, 34 formed in the back portion 11.

It will be obvious to those skilled in the art that if desired a spring clip may be substituted for the vacuum cups 32 so that the device can be clipped thereby to a sun visor in an automobile.

It will thus be seen that a simple, inexpensive, easily operated indicia indicating device has been disclosed which incorporates novel features in the disposition and arrangement of the indicia carrying wheels and the means by which they are mounted, locked, released, and reset and having thus described my invention, what I claim is:

1. An indicia indicating device comprising a housing having oppositely disposed apertures, notches in said housing communicating with said apertures, at least one plunger movably positioned transversely of said housing in said apertures, a spline on one portion of said plunger, at least one indicia carrying wheel having several internal grooves positioned on said splined portion of said plunger, and having a portion of its periphery in registry with a window opening in said housing, said spline normally engaging one of said grooves in said indicia carrying wheel and one of said notches in said housing and acting to hold said wheel in fixed relation to said window opening, said plunger being movable longitudinally relative to said wheel and said housing to a position disengaging said spline from said grooves and said notch to permit said wheel to be rotated and means in said housing normally positioning said wheel in registry with said window opening.

2. The indicia indicating device set forth in claim 1 and wherein a resilient member is positioned in said housing and engaged on said plunger and normally urges said plunger in a direction in which said spline is engaged in said wheel.

3. The indicia indicating device set forth in claim 1 and wherein the means for positioning said indicia wheel in registry with said window opening comprises a longitudinal apertured partition in said housing.

4. The indicia indicating device set forth in claim 1 and wherein said housing comprises a front portion and a back portion forming respective halves thereof, each of said portions having transversely aligned openings and notches in its side portions comprising the apertures for the reception of said plunger.

5. The indicia indicator set forth in claim 1 and wherein the means in said housing for positioning said wheel beneath said window comprises an apertured partition and wherein said plunger has a shoulder thereon within said housing and wherein a coil spring is positioned around said plunger between said shoulder and said partition.

6. The indicia indicator set forth in claim 1 and wherein the portion of the plunger having said spline thereon comprises a separate member attached to said plunger.

References Cited by the Examiner

UNITED STATES PATENTS

| 1,443,558 | 1/23 | Bloomfield et al. | 40—86 |
| 1,455,547 | 5/23 | Needham | 235—117.1 |
| 1,720,085 | 7/27 | Meyers | 40—68 |
| 1,828,896 | 10/31 | Hershey | 40—68 |
| 2,785,488 | 3/57 | Brooks | 40—68 |

FOREIGN PATENTS

| 359,046 | 1/62 | Switzerland. |
| 823,813 | 12/51 | Germany. |
| 1,124,099 | 6/56 | France. |
| 1,193,537 | 4/59 | France. |

JEROME SCHNALL, *Primary Examiner.*

C. W. ROBINSON, *Examiner.*